US012176696B2

(12) United States Patent
Nowastowski-Stock

(10) Patent No.: US 12,176,696 B2
(45) Date of Patent: Dec. 24, 2024

(54) INSERTION COMPONENT AND KIT FOR A CABLE PASSAGE FOR WALLS

(71) Applicant: CONTA-CLIP VERBINDUNGSTECHNIK GMBH, Hövelhof (DE)

(72) Inventor: Jörg Nowastowski-Stock, Detmold (DE)

(73) Assignee: CONTA-CLIP VERBINDUNGSTECHNIK GMBH, Hövelhof (DE)

( * ) Notice: Subject to any disclaimer, the term of this patent is extended or adjusted under 35 U.S.C. 154(b) by 195 days.

(21) Appl. No.: 17/763,459

(22) PCT Filed: Sep. 23, 2020

(86) PCT No.: PCT/DE2020/100823
§ 371 (c)(1),
(2) Date: Mar. 24, 2022

(87) PCT Pub. No.: WO2021/058064
PCT Pub. Date: Apr. 1, 2021

(65) Prior Publication Data
US 2022/0344920 A1 Oct. 27, 2022

(30) Foreign Application Priority Data
Sep. 25, 2019 (DE) ...................... 20 2019 105 325.9

(51) Int. Cl.
H02G 3/22 (2006.01)
(52) U.S. Cl.
CPC ..................... H02G 3/22 (2013.01)
(58) Field of Classification Search
None
See application file for complete search history.

(56) References Cited

U.S. PATENT DOCUMENTS 4,157,799 A * 6/1979 Simon .................. H02G 3/0625
439/449
4,764,422 A * 8/1988 Hill .......................... H02G 3/22
428/322.2

(Continued)

FOREIGN PATENT DOCUMENTS

DE 102005032896 A1 1/2007
DE 102008028278 A1 9/2009

(Continued)

OTHER PUBLICATIONS

International Search Report and Written Opinion of the International Search Authority, issued in PCT/DE2020/100823, mailed Dec. 14, 2020; ISA/EP.
Search report from corresponding App No. DE 20 2019 105 325.9 dated Aug. 5, 2020.

Primary Examiner — Krystal Robinson
(74) Attorney, Agent, or Firm — Harness, Dickey & Pierce, P.L.C.

(57) ABSTRACT

The invention relates to an insert component (4) for a cable feed-through for walls, comprising: a frame component (4a) consisting of a hard material component and at least partially surrounding a component opening; a membrane (5) consisting of a soft material component and covering the component opening; a securing device which is designed to secure the frame component (4a) together with the membrane (5) to a cable feed-through for walls, when said frame component is inserted into a through-opening of the cable feed-through for walls; and an arrangement of cable-receiving means having cable-receiving means (15) distributed over a surface of the membrane (5), each of which has a pierceable membrane section (16) provided on the front side and a cable bushing provided on the rear side, in a cable insertion direction miming transverse to the surface of the membrane (5), which bushing is designed to provide strain relief for an (Continued)

inserted cable. The invention also relates to a kit for a cable feed-through for walls.

15 Claims, 8 Drawing Sheets

(56) References Cited

U.S. PATENT DOCUMENTS

| | | | | | |
|---|---|---|---|---|---|
| 4,889,298 | A | * | 12/1989 | Hauff | F16L 5/08 |
| | | | | | 174/503 |
| 5,775,702 | A | * | 7/1998 | Laeremans | G02B 6/44775 |
| | | | | | 174/152 G |
| 5,831,217 | A | * | 11/1998 | Jarvis | H02G 3/22 |
| | | | | | 174/76 |
| 7,579,557 | B2 | * | 8/2009 | Tapper | H02G 3/083 |
| | | | | | 174/152 G |

FOREIGN PATENT DOCUMENTS

| | | | | |
|---|---|---|---|---|
| DE | 102009060988 B3 | | 5/2011 | |
| DE | 102014208291 A1 | | 11/2015 | |
| EP | 1710882 A2 | | 10/2006 | |
| EP | 1811625 A1 | | 7/2007 | |
| EP | 2866322 A1 | * | 4/2015 | ............ H02G 3/085 |
| EP | 3404789 A1 | | 11/2018 | |
| WO | WO-2016177364 A1 | | 11/2016 | |
| WO | WO-2018001419 A1 | | 1/2018 | |

* cited by examiner

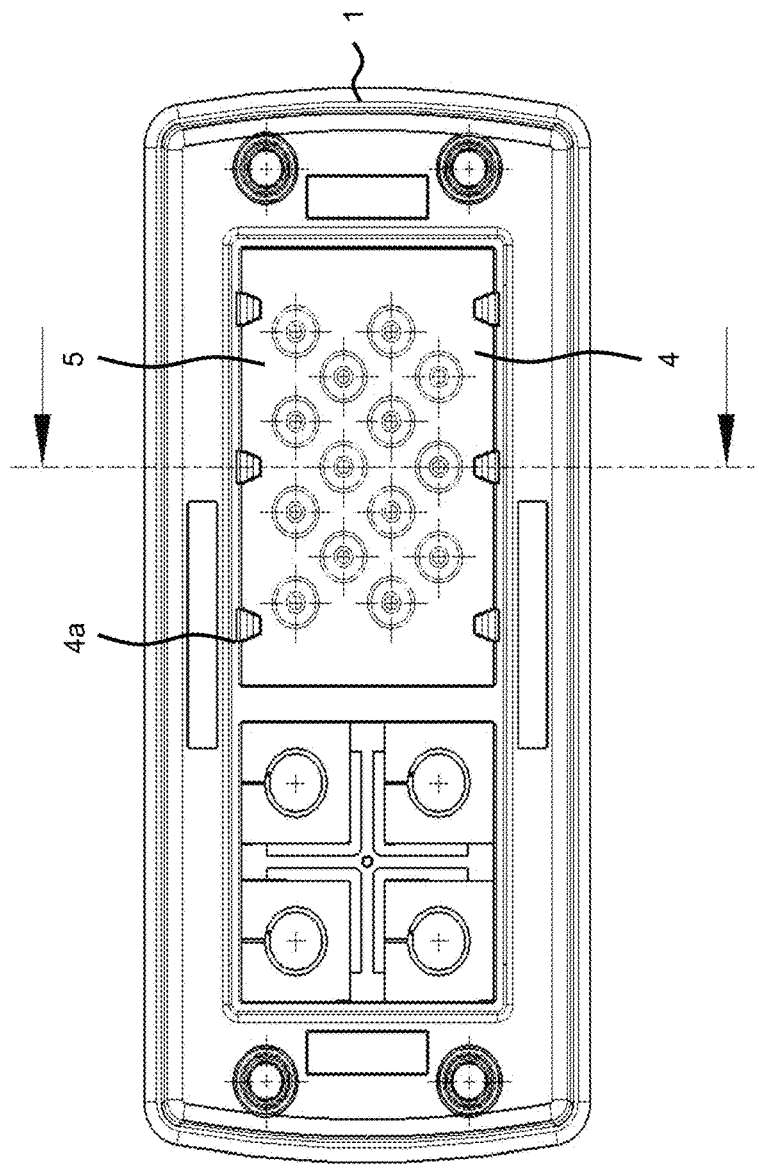
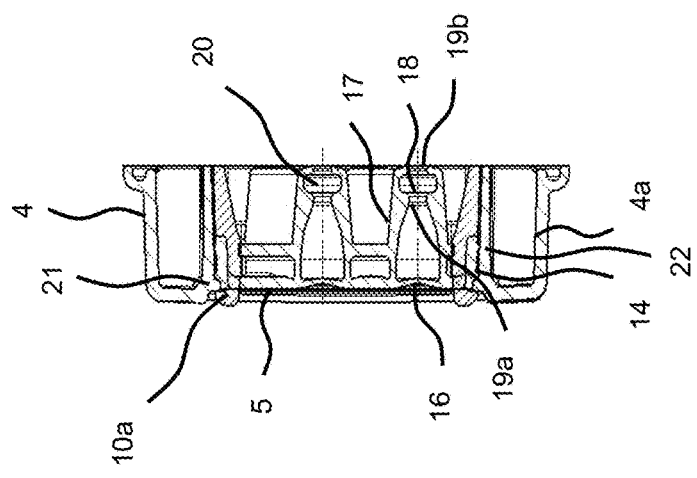
Fig. 3

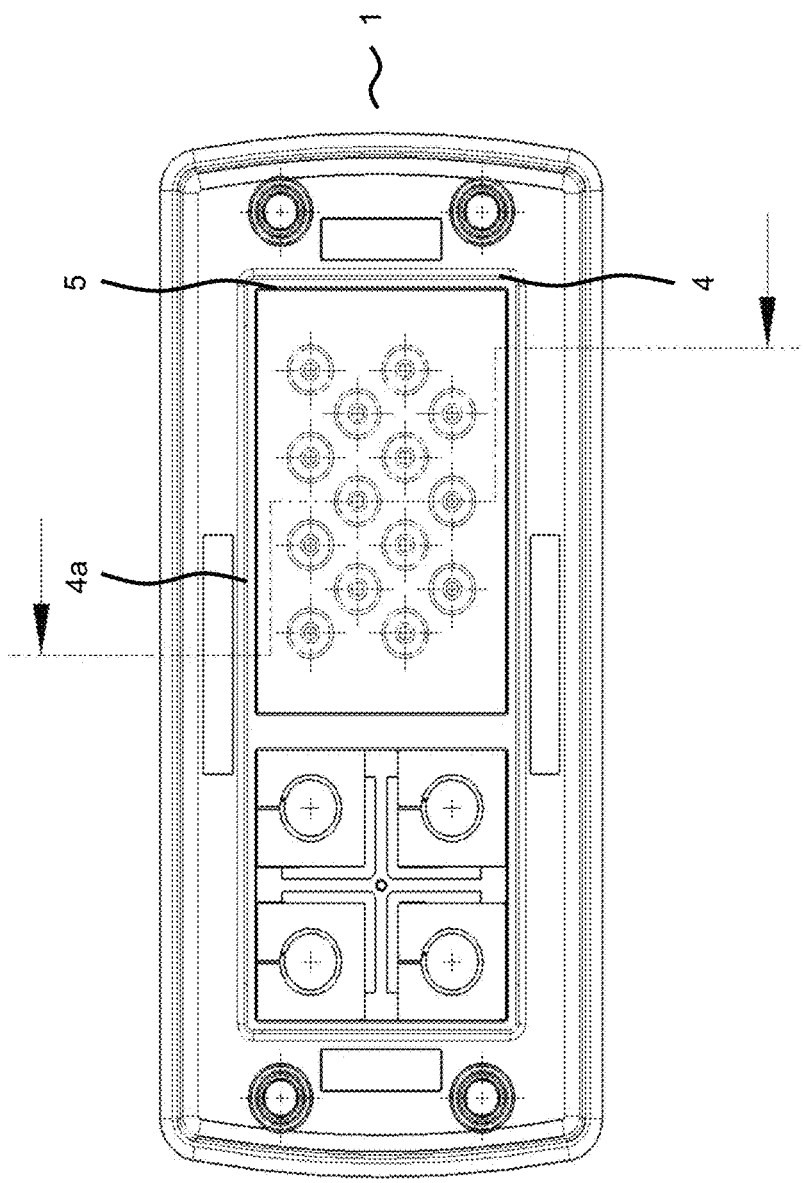
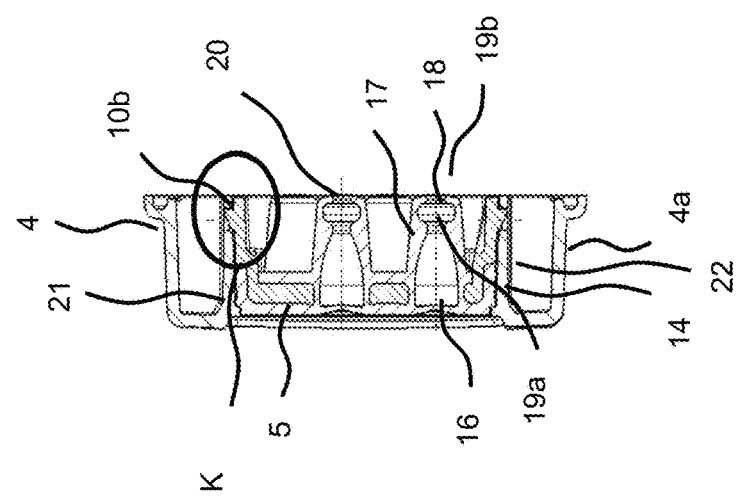
Fig. 4

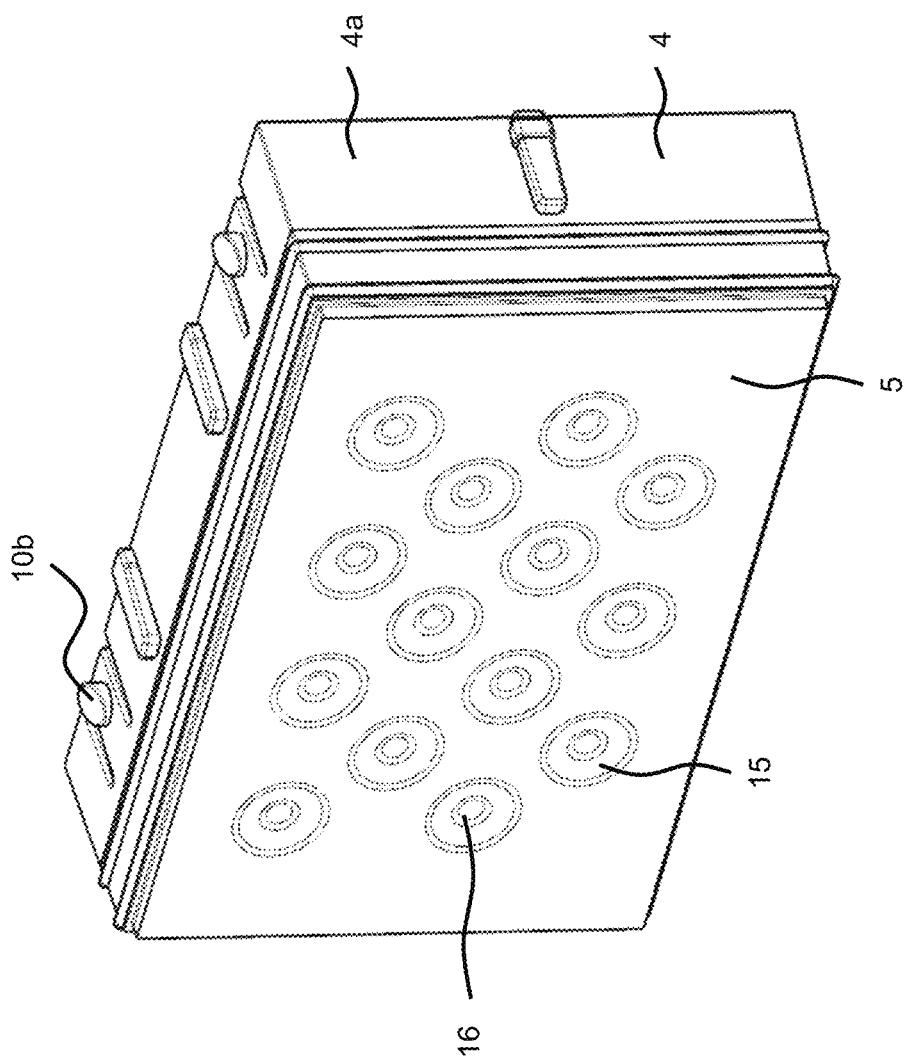

INSERTION COMPONENT AND KIT FOR A CABLE PASSAGE FOR WALLS

CROSS-REFERENCE TO RELATED APPLICATIONS

This application is a 371 U.S. National Phase of International Application No. PCT/DE2020/100823, filed Sep. 23, 2020, which claims priority to German Patent Application No. 20 2019 105 325.9, filed Sep. 25, 2019. The entire disclosures of the above applications are incorporated herein by reference.

The invention relates to an insertion component and to a kit for a cable feed-through for walls.

BACKGROUND

Cable feed-throughs or passages for walls, or wall bushings, are used to guide cables through partition walls, in particular housing or sound cabinet walls. In this case, a wall opening through which the cables will be routed from one side of the wall to the other is provided in the wall. WO 2016 177 364 A1 and WO 2018 001 419 A1 disclose arrangements for a cable feed-through for walls, as well as methods for the production thereof. A feed-through opening is formed on a housing component, which can also be referred to as a flange plate, and is divided into a plurality of receptacles for cable feed-through elements or sealing elements by means of a frame element. One or more such sealing elements can be inserted into the receptacles of the frame element, each providing a sealing cable receptacle.

SUMMARY

The object of the invention is to specify an insertion component and a kit for a cable feed-through for walls, or for a wall bushing, by means of which a plurality of cables can be guided through an associated wall opening, with a seal, in a simplified manner.

To solve the problem, an insertion component and a kit for a cable feed-through for walls according to independent claims 1 and 15 are created. Embodiments are the subject matter of dependent claims.

According to one aspect, an insertion component for a cable feed-through for walls is created, which comprises the following: a frame element made of a hard material component, which at least partially surrounds an element opening; a membrane made of a soft material component which covers the element opening; a fastening device configured to secure the frame element with the membrane to a cable feed-through for walls, or a wall bushing, when said frame element is inserted into a passage opening of the cable feed-through for walls; and an arrangement of cable receptacles, which arrangement has cable receptacles distributed over a surface of the membrane, each of which has, in a cable insertion direction that runs transverse to the surface of the membrane, a push-through membrane portion arranged on the front side, and a cable grommet arranged on the rear side, which cable grommet is configured to form a traction relief for an inserted cable.

According to a further aspect, a kit for a cable feed-through for walls is created, having an installation component and an insertion component. The installation component, which can be formed, for example, with a box element or frame element, or a flange plate, has a plurality of receptacles, each for receiving one or more cable feed-through elements, and is configured to be installed in the region of a wall opening. The insertion component is configured to be inserted into one of the receptacles, optionally with a positive fit and/or self-clamping therein.

With the kit, an arrangement for a cable feed-through for walls can be formed, in which the insertion component is arranged in one of the receptacles of the wall feed-through during installation. To produce the arrangement, the installation component can be installed in the region of a wall opening. Before or afterward, the insertion component is inserted into one of the receptacles of the installation component, thus providing a plurality of cable receptacles, into each of which a cable can be inserted in such a way that the push-through membrane portion is pierced or cut open in order to insert the cable in the insertion direction. Before the cable is inserted, the push-through membrane portion is closed, for example when the insertion component is inserted. In this way, the cable receptacles of the arrangement remain closed in the region of the membrane until a cable will actually be inserted.

The push-through membrane portions are distributed over the surface of the membrane, whether according to a regular or an irregular arrangement of spaced push-through membrane portions. The insertion component thus makes it possible for a plurality of cables to be accommodated in a cable feed-through for walls. In the initial state, the membrane forms a closed membrane surface over which the push-through membrane portions assigned to the cable receptacles are distributed.

When the cable feed-through for walls is produced, the receptacles of the installation component can first be closed with a closure component, for example each with a closure plate, which can be removed as a result of predetermined breaking points in order to expose the receptacle, whereupon the insertion component can be pushed or inserted into the receptacle, thereby itself providing the cable receptacles provided for the cable feed-through in the region of the receptacle.

The fastening device can be formed on the frame element. The fastening device can be continuous all the way around the frame element, or interrupted, by way of example with fastening elements such as projections and/or depressions arranged with a spacing around the circumference. The fastening elements can be mounted in an elastically resilient manner on the frame element.

In one embodiment, the fastening elements are arranged in the region of a circumferential lateral surface of the frame element, either on a part of the circumferential lateral surfaces or on all circumferential lateral surfaces. In this or other embodiments, the fastening device can be configured to work together with an associated fastening device on a cable feed-through for walls, in particular on the installation component, when the insertion component is inserted into a receptacle of the cable feed-through for walls.

The fastening device can have latching projections which are configured to lock the frame element with the membrane in a cable feed-through for walls, when said frame element is inserted into a receptacle of the cable feed-through for walls, for example into the installation component. The latching projections, whether in the form of front and/or rear locking lugs, can be formed with locking lugs that are elastically mounted. It can be provided that the latching projections are initially pushed back elastically when the insertion component is inserted into the receptacle of the cable feed-through for walls, particularly in the direction of the element opening, and then spring back into an inserted final position, so as to at least partially engage in an associated depression in the region of the receptacle of the cable feed-through for walls, and thus secure the insertion component in it. Other click connections can be provided.

The front latching projections can be arranged on a frontal frame element portion in the cable insertion direction. The rear latching projections can be arranged on a rear frame element portion in the cable insertion direction. A combination of front and rear latching projections may be provided. One or more of the latching projections can be arranged in the region of a circumferential lateral surface of the insertion component. In the inserted final position, the latching projections can work together with associated locking lugs or locking depressions on the wall feed-through.

The frame element and the membrane can be made of a plastics material. The insertion component can be a 2-component or a multi-component injection-molded element. In this way, a component can be provided which, due to the plastic hard material component and the plastic soft material component, provides different functionalities as an overall component, which functionalities result from the different properties of the material components. The soft and hard material components can then in particular be plastics materials with different Shore hardnesses. The soft material component can be an elastically yielding material, whereas the hard material component is not elastically yielding. Polyamide, for example, can be used as the plastic hard material component. The soft material component can be, for example, a thermoplastic elastomer.

The insertion component can have conical edge portions in the region of a circumferential edge. The conical edge portion can be continuous all the way around the insertion component, or interrupted. For example, the conical formation of the edge portions may be provided only on two opposite sides. The conical formation can be designed in such a way that there is a narrowing formed in the direction of insertion. During the installation of the insertion component in an associated receptacle of the (cable) feed-through for walls, the receptacle for the insertion component also has a conical design, such that, when the insertion component is inserted, conically designed surfaces come to rest on one another.

The frame element can be embedded at least in portions in the soft material component, or be surrounded by it. Portions of the frame element can be partially or completely encased by the soft material. For example, a front corner region of the frame element in the cable insertion direction can be encased with the soft material component all the way round, either continuously or non-continuously. An interruption in the casing or embedding can be provided, for example, in connection with the fastening device, in particular for latching projections which can be formed in the soft material component free of the embedding. This applies, for example, to the latching projections on the front in the cable insertion direction. Comparably, other portions of the frame element can be at least partially embedded in the soft material component, for example rear corner regions in the direction of insertion, wherein it is also possible in this case for rear latching projections to be exposed.

The cable grommet can have a portion that is conical in cross section in the cable insertion direction. A conical grommet can be formed with the conical portion.

The frame element can have frame element portions which extend in the element opening between the cable receptacles and are covered by the soft material component, at least on the front side in the cable insertion direction. The frame element portions can substantially be completely surrounded by the soft material component.

In the cable receptacles, a receiving portion with the cable grommet can be arranged exposed on a rear side of the membrane in the insertion direction. The exposed receiving portion on the rear side of the membrane can have a pot shape, in particular a conical pot shape, which tapers in the insertion direction towards the end of the cable receptacles on the rear side.

Bars or webs can be arranged on the rear side of the membrane, which, for at least some of the cable grommets, connect adjacent cable grommets to one another. The membrane, as well as the ribs that stabilize the arrangement of cable receptacles distributed around it, can be provided with the bars.

The cable grommet can have a widened grommet portion adjacent to a grommet portion in the insertion direction, in which the cross section is greater than that of the grommet portion. A sequence of at least two grommet portions and at least one widened grommet portion can be provided, with the grommet portions being arranged adjacent to each other. The grommet portion and the widened grommet portion can be arranged adjacent to an end of the cable receptacle on the rear side in the insertion direction.

The insertion component can have at least one circumferential sealing lip. The circumferential sealing lip can consist of the soft material component. The circumferential sealing lip, which can be continuous or non-continuous, can be arranged on the outside of a casing of the frame element made of the soft material component. In the direction of insertion, a plurality of sealing lips can form a sealing lip arrangement, one behind the other. The circumferential sealing lip can be arranged in particular on a circumferential lateral surface of the insertion component.

The configurations explained above in connection with the insertion component can be provided in a corresponding manner in the context of the kit for the cable feed-through for walls. If one or more sealing lips are provided on the insertion component, the receptacle of the wall feed-through can have depressions assigned to it, in which an assigned sealing lip engages at least partially, for example substantially positively, after the insertion component has been inserted.

The cable receptacles of the insertion component can be designed to receive the associated cable in a fluid-tight manner after it has been inserted.

DESCRIPTION OF EMBODIMENTS

Further embodiments are explained below with reference to the drawings, in which:

FIG. 3 is a schematic view of the kit for the cable feed-through for walls of FIG. 1, from behind and in section;

FIG. 4 is a schematic view of a further kit for a cable feed-through for walls, from behind and in section;

FIG. 8 is a schematic perspective view of the further insertion component of FIG. 6, from the front at an angle.

FIG. 1 is a schematic perspective view of a kit for a cable feed-through for walls, having an installation component 1 (wall passage or bushing) which is made of a plastics material, for example in one or more pieces, as is known per se in various embodiments, for example from WO 2016 177 364 A1 and WO 2018 001 419 A1.

Figure 2:
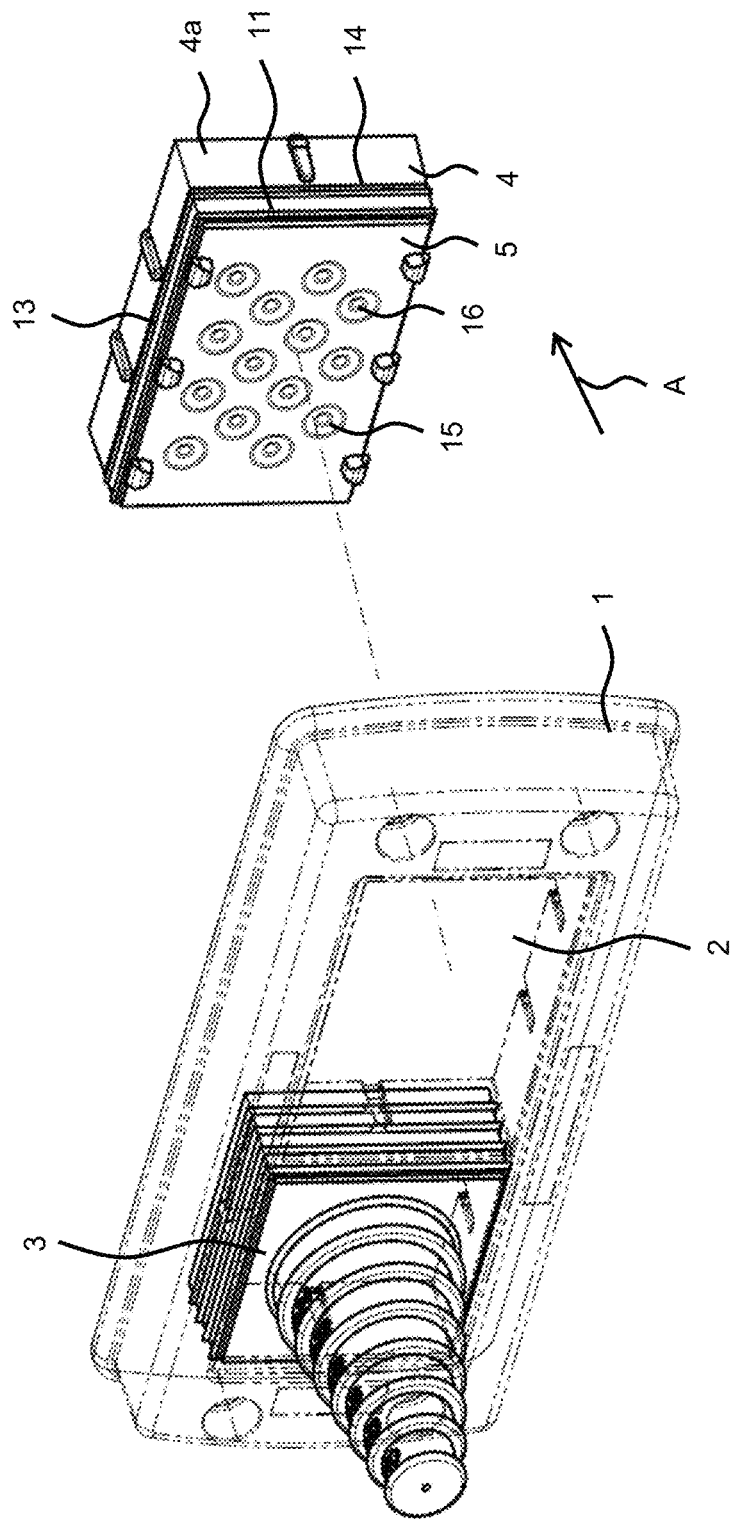
FIG. 2 is a schematic view of a further kit for a cable feed-through for walls, from the front at an angle.

A further embodiment of such a cable feed-through for walls, having the installation component 1, is shown in FIG. 2.

Receptacles 2 are provided in the installation component 1, into which individual sealing elements 3, and also the insertion component 4, can be inserted in order to guide cables (not shown) through an associated wall opening (not shown) in a sealing manner by means of the cable feed-through for walls.

Figure 1:
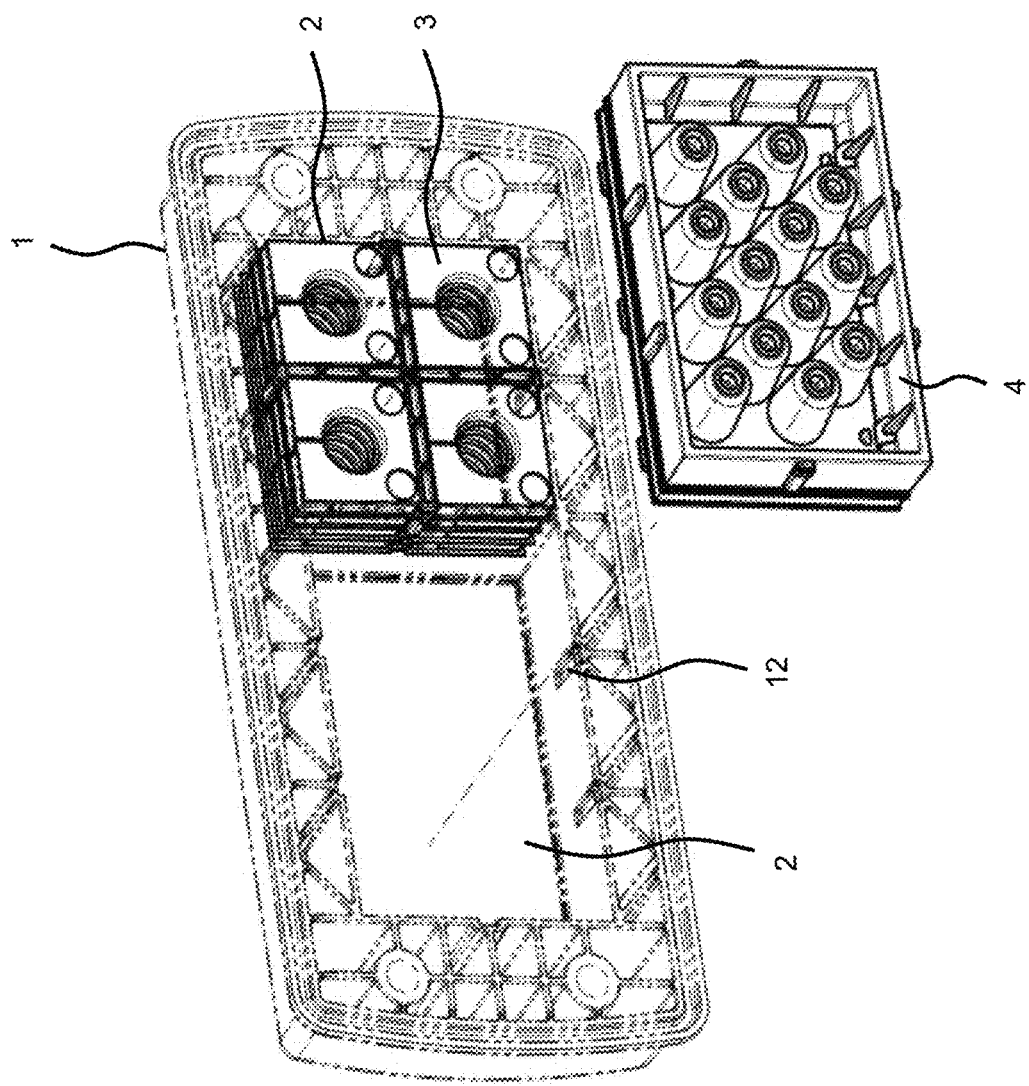
FIG. 1 is a schematic perspective view of a kit for a cable feed-through for walls, from behind at an angle.
Figure 5:
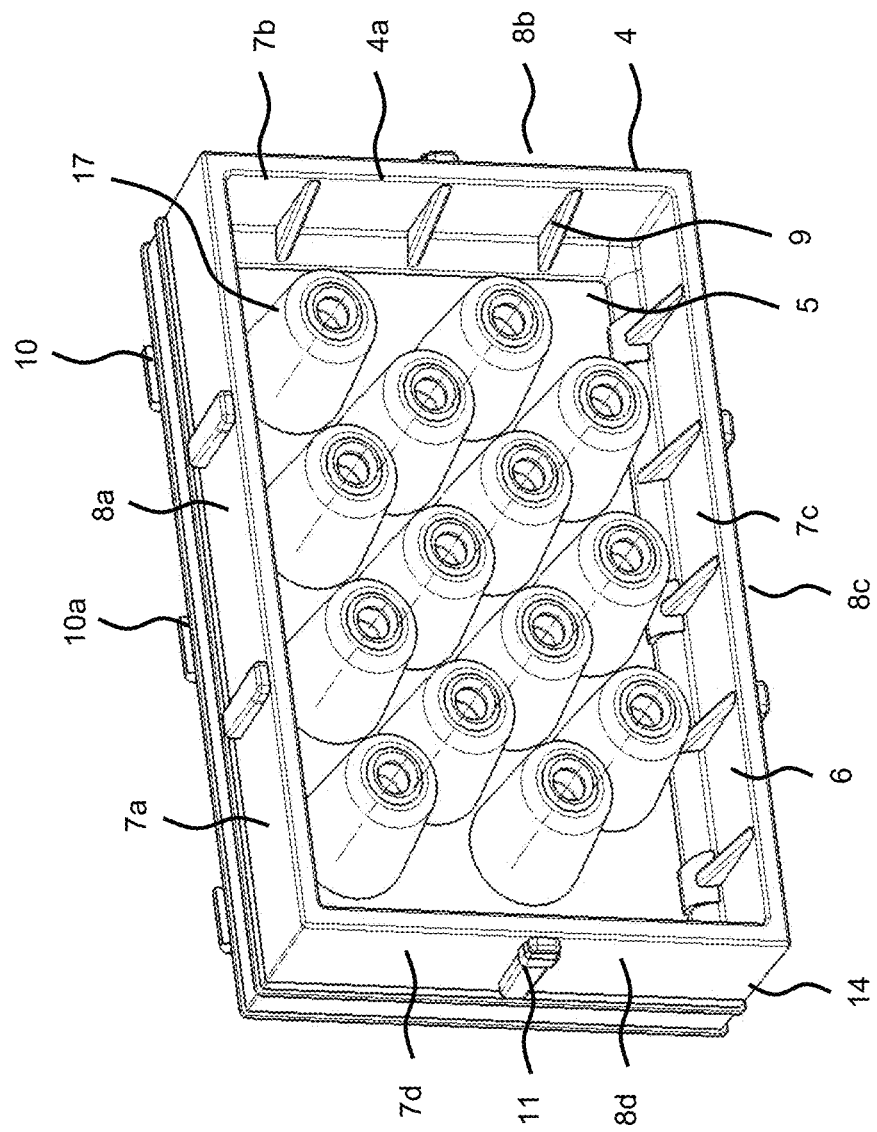
FIG. 5 is a schematic perspective view of an insertion component with frontal locking lugs, from behind at an angle.
Figure 7:
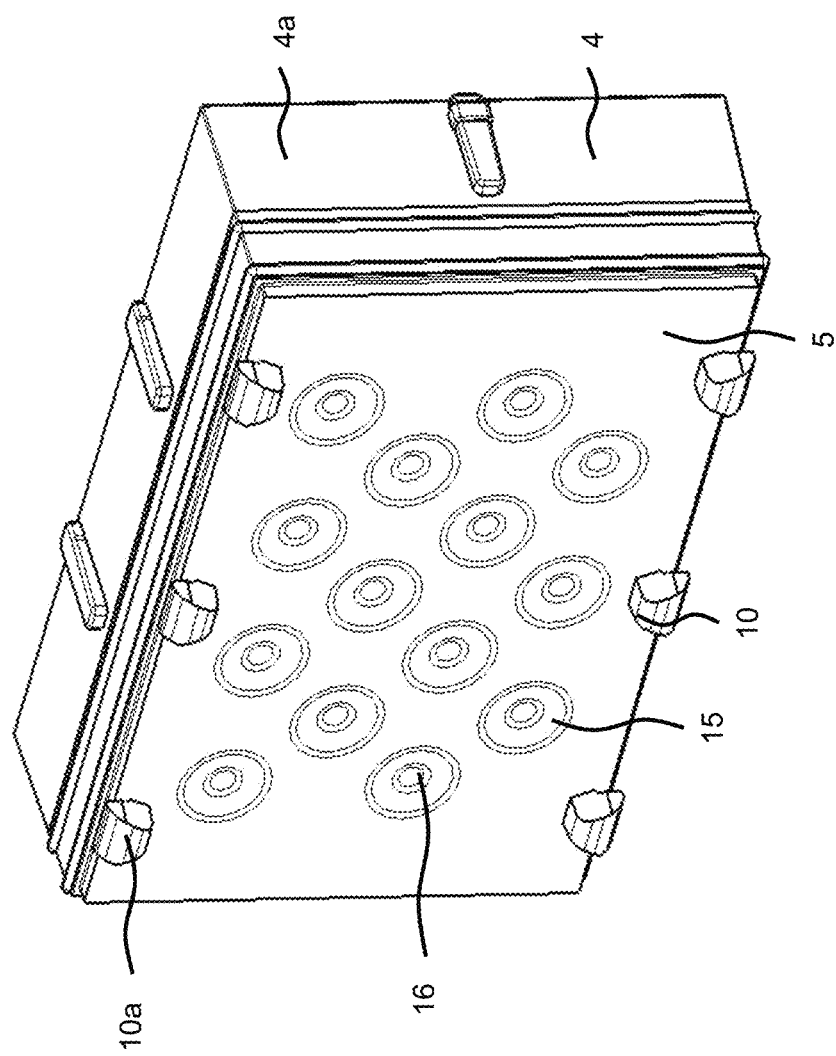
FIG. 7 is a schematic perspective view of the insertion component of FIG. 5, from the front at an angle.

FIG. 3 shows the arrangement of FIG. 1, from behind and in section. The insertion component 4 is shown in perspective in FIGS. 5 and 7, from behind at an angle and from the front at an angle.

The insertion component 4 has a frame element 4a made of a hard material component, and also a membrane 5 made from a soft material component. The membrane 5 covers an element opening 6 which is surrounded by the frame element 4. The frame element 4 has circumferential frame element portions 7a, . . . , 7d, on which lateral surfaces 8a, . . . , 8d are formed. Reinforcing ribs 9 are provided on the inside of the frame element portions 7a, . . . , 7d.

A fastening device 10 is formed on the frame element 4, which serves to secure the insertion component 4 in the associated receptacle of the installation component 1 after it has been inserted or pushed in, for example by means of a latching or click connection. For this purpose, front and/or rear locking lugs 10a, 10b are provided (see FIGS. 3 and 4).

In addition, projections 11 are arranged on the lateral surfaces 8a, . . . , 8d, which engage in associated depressions 12 (see FIG. 1) upon insertion into the receptacle 2. A conical formation of projections 11 and/or depressions 12 can be provided.

In the embodiment shown, the insertion component 4 is produced by means of 2-component injection molding in such a way that the soft material component from which the membrane 5 is formed encases or surrounds the frame element 4a in the front corner regions 13. Circumferential sealing lips 14 are also formed on the lateral surfaces 7a, . . . , 7d of the frame element 4 by means of the soft component material.

Cable receptacles 15 are provided distributed over the surface of the membrane 5; a push-through membrane portion 16 is assigned to each of these on the front side in the cable insertion direction (see the arrow A in FIG. 2). A cable grommet 17 is provided in each case behind the push-through membrane portion 16 in the insertion direction. The cable grommet 17 has a traction relief 18 for the inserted cable. When a cable (not shown) is inserted, it first pierces the push-through membrane portion 16, and then, as it is pushed in further, reaches the region of the traction relief 18, in order to finally be pushed through the cable receptacle.

The portions of the cable receptacles with the cable grommet 17 are arranged exposed on the rear side of the membrane 5.

In the region of the traction relief 18, the cable grommet 17 has grommet portions 19a, 19b, between which a widened grommet portion 20 is arranged, the cross section of which is greater than that of the grommet portions 19a, 19b (enlarged diameter).

According to FIG. 3 (see the cross-sectional view), the latching projections 10a lock on the frame element 4a after the insertion of the insertion component 4 with the associated projections 21. The sealing lips 11 are at least partially received in associated depressions 22 on the frame element 4a.

In the embodiment shown, the receptacle 2 and the insertion component 4 have a (circumferential) conical design (see FIG. 3).

Figure 6:
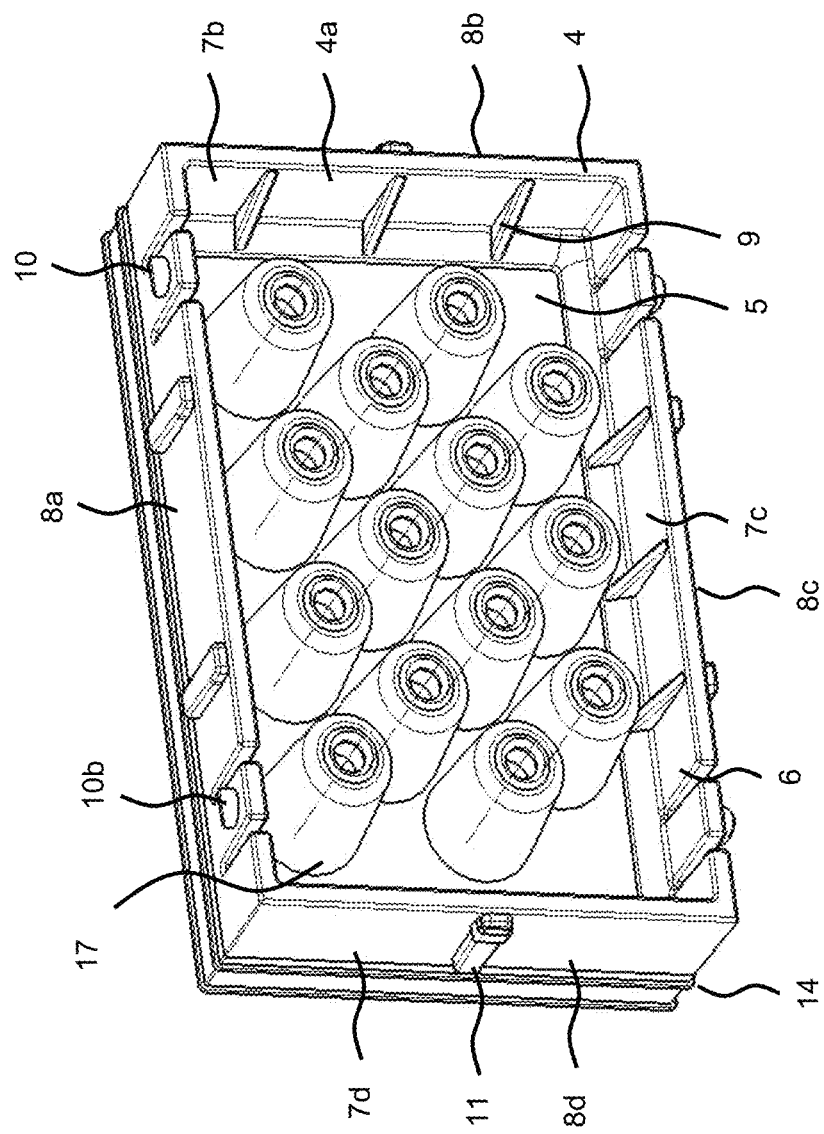
FIG. 6 is a schematic perspective view of a further insertion component with rear locking lugs, from behind at an angle.

In an alternative embodiment, which is shown in FIG. 4, the rear locking lugs 10b snap in on the rear side (see the circular marking K in the sectional view). The insertion component 4 used here is shown in FIGS. 6 and 8.

The features disclosed in the above description, the claims, and the drawings may be of relevance, both individually and also in any combination, for implementing the various embodiments.

The invention claimed is:

1. An insertion component for a cable feed-through for walls, comprising:
    a frame element made of a hard material component, which at least partially surrounds an element opening;
    a membrane made of a soft material component, which covers the element opening;
    a fastening device which is configured to secure the frame element with the membrane to a cable feed-through for walls when said frame element is inserted into a passage opening of the cable feed-through for walls; and
    an arrangement of cable receptacles, having cable receptacles distributed over a surface of the membrane, each of which has, in a cable insertion direction that runs transverse to the surface of the membrane, a push-through membrane portion arranged on the front side, and a cable grommet arranged on the rear side, which cable grommet is configured to form a traction relief for an inserted cable.

2. The insertion component according to claim 1, wherein the fastening device is formed on the frame element.

3. The insertion component according to claim 1, wherein the fastening device has latching projections which are configured to lock the frame element with the membrane in a cable feed-through for walls when said frame element is inserted into a receptacle of the cable feed-through for walls.

4. The insertion component according to claim 3, wherein the frontal latching projections are arranged on a frontal frame element portion in the cable insertion direction.

5. The insertion component according to claim 3, wherein rear latching projections are arranged on a rear frame element portion in the cable insertion direction.

6. The insertion component according to claim 1, wherein the frame element and the membrane are made of a plastics material.

7. The insertion component according to claim 1, characterized by conical edge portions in the region of a circumferential edge.

8. The insertion component according to claim 1, wherein the frame element is embedded at least in portions in the soft material component.

9. The insertion component according to claim 1, wherein the cable grommet has a portion which is conical in cross section in the cable insertion direction.

10. The insertion component according to claim 1, wherein the frame element has frame element portions which extend in the element opening between the cable receptacles, and which are covered at least on the front side in the cable insertion direction by the soft material component.

11. The insertion component according to claim 1, wherein for each of the cable receptacles, a receiving portion with the cable grommet is arranged exposed on a rear side of the membrane in the insertion direction.

12. The insertion component according to claim 11, wherein bars are arranged on the rear side of the membrane, which, for at least some of the cable grommets, connect adjacent cable grommets to each other.

13. The insertion component according to claim 1, wherein the cable grommet has, adjacent to a grommet portion in the insertion direction, a widened grommet portion in which the cross section is greater than that of the grommet portion.

14. The insertion component according to claim 1, characterized by at least one circumferential sealing lip.

15. A kit for a cable feed-through for walls, having
an installation component which has a plurality of receptacles, each for receiving one or more cable feed-through elements, and which is configured to be installed in the region of a wall opening; and
an insertion component according to claim 1, which is configured to be inserted into one of the receptacles.

* * * * *